(12) United States Patent
Miyamura et al.

(10) Patent No.: US 10,269,378 B1
(45) Date of Patent: Apr. 23, 2019

(54) BACKWARD COMPATIBILITY TAPE READ HEAD

(71) Applicant: INTERNATIONAL BUSINESS MACHINES CORPORATION, Armonk, NY (US)

(72) Inventors: Tsuyoshi Miyamura, Yokohama (JP); Eiji Ogura, Yokohama (JP); Tomoko Taketomi, Shinagawa-Ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/994,770

(22) Filed: May 31, 2018

(51) Int. Cl.
| G11B 5/09 | (2006.01) |
| G11B 5/008 | (2006.01) |
| G11B 20/18 | (2006.01) |
| G11B 5/48 | (2006.01) |
| G11B 5/584 | (2006.01) |

(52) U.S. Cl.
CPC ...... *G11B 5/00882* (2013.01); *G11B 5/00826* (2013.01); *G11B 5/4893* (2013.01); *G11B 5/584* (2013.01); *G11B 20/18* (2013.01)

(58) Field of Classification Search
None
See application file for complete search history.

(56) References Cited

U.S. PATENT DOCUMENTS

| 7,675,710 B2 | 5/2010 | Hennecken et al. |
| 8,665,560 B1 | 3/2014 | Biskeborn et al. |
| 9,251,825 B2 | 2/2016 | Biskeborn et al. |
| 9,269,375 B2 | 2/2016 | Biskeborn et al. |
| 2005/0168864 A1* | 8/2005 | Knowles ................ G11B 5/584 360/77.12 |
| 2005/0168865 A1* | 8/2005 | Simmons, Jr. ....... G11B 5/4976 360/77.12 |
| 2008/0037154 A1* | 2/2008 | Biskeborn .......... G11B 5/00826 360/48 |
| 2008/0137235 A1* | 6/2008 | Biskeborn .............. G11B 5/584 360/317 |
| 2010/0232047 A1* | 9/2010 | Cherubini .......... G11B 20/1202 360/48 |
| 2015/0170694 A1 | 6/2015 | Herget |
| 2015/0255093 A1* | 9/2015 | Biskeborn ........ G11B 20/10305 369/53.38 |
| 2016/0365111 A1 | 12/2016 | Partee et al. |

FOREIGN PATENT DOCUMENTS

| JP | 09135423 A | 5/1997 |
| JP | 11-185322 A | 7/1999 |
| JP | 2006221729 A | 8/2006 |
| JP | 2006244540 A | 9/2006 |
| JP | 2012506599 A | 3/2012 |

* cited by examiner

*Primary Examiner* — Peter Vincent Agustin
(74) *Attorney, Agent, or Firm* — L. Jeffrey Kelly

(57) ABSTRACT

A magnetic tape head module read element array includes servo readers and read elements configured in accordance with a tape standard. Each read element includes a plurality of read sensors. A microprocessor receives the generation of the tape technology standard and identifies, based on the generation, a combination of read sensors in each read element. Data signals from each read sensor in each combination are buffered. The microprocessor performs error detection and error correction operations on the buffered signal data for each combination of read sensors to generate verified track data in accordance with the generation of tape.

17 Claims, 12 Drawing Sheets

BACKWARD COMPATIBILITY TAPE READ HEAD

BACKGROUND

The present invention relates generally to the field of magnetic information storage and retrieval, and more particularly to retrieving information from magnetic tape storage media that was written to the tape based on specifications from a previous generation of the tape technology.

SUMMARY

Embodiments of the present invention disclose an apparatus that includes a magnetic tape head module read element array that includes one or more servo readers and a plurality of read elements. The servo readers and the plurality of read elements are configured in the tape head module read element array in accordance with a tape technology standard. Each read element of the plurality of read elements further includes a plurality of read sensors. A microprocessor is operated to receive information indicative of a generation of the tape technology standard. The microprocessor is further operated to identify, based on the generation, a combination of read sensors in each read element from a plurality of combinations associated with a corresponding plurality of generations. The microprocessor is further operated to buffer signal data associated with each read sensor in each identified combination that results from electrical signals generated by each read sensor from magnetic transitions recorded on a magnetic tape recording medium in accordance with the generation of the tape technology standard as the magnetic tape recording medium passes by the tape head module read element array. The microprocessor is further operated to perform error detection and error correction operations on the buffered signal data for each identified combination of read sensors to generate verified track data in accordance with the generation of tape.

Other embodiments of the invention disclose a tape appliance that includes a special purpose magnetic tape head module that includes a read element array that includes one or more servo readers and a plurality of read elements, wherein the servo readers and the plurality of read elements are configured in the tape head module read element array in accordance with a tape technology standard, and wherein each read element of the plurality of read elements further comprises a plurality of read sensors. A servo control circuit performs servo tracking of the magnetic tape head module, based on electrical signals received from the one or more servo readers. A read/write dataflow circuit controls data transfer operations from each of the read sensors to a data buffer, based on electrical signals generated by each read sensor from magnetic transitions recorded on a magnetic tape recording medium as the magnetic tape recording medium passes by the tape head module read element array. A microprocessor controller controls the operation of the servo control circuit and the read/write dataflow circuit. The microprocessor controller operates to perform the following. Receive information from a tape cartridge memory indicative of a generation of the tape technology standard with which data was written to the magnetic tape recording medium of the tape cartridge. Identify, based on the generation, a combination of read sensors in each read element from a plurality of combinations corresponding to a plurality of generations. Cause the servo control circuit to perform servo tracking based on the generation of the tape cartridge, such that the identified combination of read sensors in each read element track a data tracks of the magnetic tape recording medium of the tape cartridge. Cause the read/write dataflow circuit to write to the data buffer data received from each of the identified read sensors in each read element. Perform error detection and error correction operations on the buffered signal data for each identified combination of read sensors to generate verified track data in accordance with the generation of tape.

DETAILED DESCRIPTION

Figure 1A:
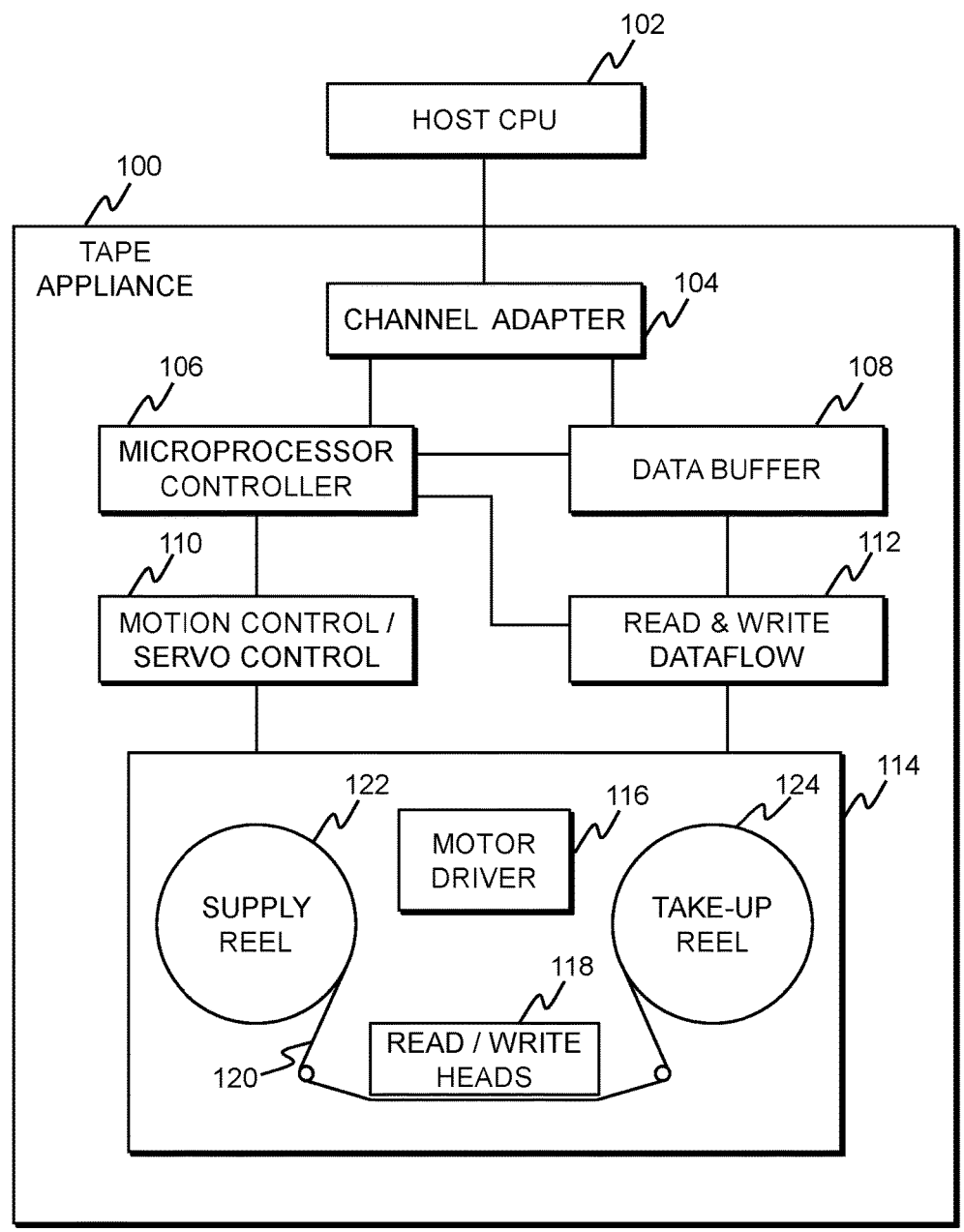
FIG. 1A is a functional block diagram illustrating a tape recording appliance, in accordance with an embodiment of the present invention.

The desire to increase the capacity of tape storage has resulted in a steady improvement in tape read and write head technology along with improvements to magnetic tape recording media to allow for greater areal density, as typically measured is bits per square inch. As improvements in tape storage technology are realized, new "generations" of a tape technology are adopted. The specifications for each generation typically define new physical characteristics for the magnetic tape media, such as track pitch, linear density (bits/mm), etc. Table 1 shows a comparison of select physical parameters associated with several generations of Linear Tape-Open (LTO) magnetic tape storage technology. All trademarks used herein are the property of their respective owners. LTO has become the de facto standard for magnetic tape storage technology and is governed by a set of standards and specifications that define how data is physically and logically written to a magnetic tape medium. These standards are controlled by the LTO Consortium, which is a group of magnetic tape and tape drive manufacturers. The standard tape cartridge form-factor for LTO technology goes by the name "Ultrium."

An Ultrium drive cannot make any use of a cartridge from a more recent generation.

Table 2 shows compatibility between different generations of tape drives and tape cartridges for a particular tape drive manufacturer.

TABLE 2

LTO TAPE DRIVE FORMAT COMPATIBILITY

|       | LTO-8 | LTO-7 | LTO-6 | LTO-5 | LTO-4 | LTO-3 | LTO-2 | LTO-1 |
|---|---|---|---|---|---|---|---|---|
| LTO-8 | RW | — | — | — | — | — | — | — |
| LTO-7 | RW | RW | — | — | — | — | — | — |
| LTO-6 | — | RW | RW | — | — | — | — | — |
| LTO-5 | — | R | RW | RW | — | — | — | — |
| LTO-4 | — | — | R | RW | RW | — | — | — |
| LTO-3 | — | — | — | R | RW | RW | — | — |
| LTO-2 | — | — | — | — | R | RW | RW | — |
| LTO-1 | — | — | — | — | — | R | RW | RW |

Legend:
RW: read and write compatible
R: read-only compatible
dash: not compatible

TABLE 1

LINEAR TAPE-OPEN GENERATION CHARACTERISTICS

|  | LTO-3 | LTO-4 | LTO-5 | LTO-6 | LTO-7 |
|---|---|---|---|---|---|
| Track pitch (µm) | 14.3 | 11.5 | 8.1 | 4.75 | 2.88 |
| Write head width (µm) | 20.2 | 14.3 | 11.5 | 8.1 | 4.75 |
| Read head width (µm) | 6.0 | 5.0 | 4.0 | 3.0 | 2.0 |
| Data bands per tape | 4 | 4 | 4 | 4 | 4 |
| Servo track span (µm) | 2859 | 2859 | 2859 | 2859 | 2859 |
| Wraps per band | 11 | 14 | 20 | 34 | 28 |
| Tracks per wrap | 16 | 16 | 16 | 16 | 32 |
| Length of 1DS (mm) | 107.36 | 81.66 | 102.98 | 102.98 | 84.02 |
| Size of 1DS (byte) | 1616943 | 1589300 | 2472040 | 2472040 | 5031000 |
| Tracks | 16 | 16 | 16 | 16 | 32 |
| Space for byte (µm) | 15.192 | 9.454 | 5.399 | 3.166 | 1.539 |
| Depth for bit (µm) | 0.133 | 0.103 | 0.083 | 0.083 | 0.067 |
| Linear density (bits/mm) | 9,638 | 13,250 | 15,142 | 15,143 | 19,094 |

Typically, a tape drive configured to support a current tape technology generation will be compatible with one or more previous generations of the technology. For example, for LTO-configured tape drives, the rules for compatibility between generations of drives and cartridges are currently as follows:

Up to and including LTO-7, an Ultrium drive can read data from a cartridge in its own generation and the two prior generations. LTO-8 drives can read LTO-7 and LTO-8 tapes, but not an LTO-6 tape.

An Ultrium drive can write data to a cartridge in its own generation and to a cartridge from the one prior generation in the prior generation's format. Additionally, some LTO-8 drives may write previously unused LTO-7 tapes with an increased, uncompressed capacity of 9 TB ("Type M-8").

A particular strength of tape storage technology is its ability for relatively inexpensive long-term archiving of data. Such archiving may occur as a result of government regulations or industry practice. Such data may be archived for many years. Because the data may be predominantly for archiving purposes, there may never be a need to access the data—sometimes referred to as write once, read never (WORN) storage. However, while such data may never be accessed, the requirement to be able to quickly access the data may still exist.

One typical way of keeping data written to tape in accordance with an older generation technology accessible to current generation technology is to regularly migrate the data on the tape to current generation tape cartridges. For example, if tape drives configured to the latest generation will be adopted, and there is data stored on tape drive cartridges that will no longer be compatible with the latest generation, that data would be migrated "up" to a generation that will be compatible to the latest generation. A problem with this approach is that migrating data in this manner can be very time consuming. As a result, companies and organizations with a large amount of archived data might delay investment in replacing older tape technology.

It would be advantageous for companies and organizations with a large amount of archived data to be able to replace their older LTO tape technology with current LTO tape technology, and still be able to access data that has been written using older generation tape technology, even though the older generation data is not compatible with the current generation, as defined by the LTO standards.

Embodiments of the invention are generally directed to an LTO tape appliance that can read data off of tapes that were written in accordance to a previous LTO generation that traditionally would not be compatible with the generation of the LTO appliance. The LTO tape appliance incorporates a special purpose read head configured with read elements that include sets of read sensors arranged to span the widest expected track width, based on the oldest LTO generation of tape that is desired to be read, yet include sensors narrow enough to, for example, read tracks written in accordance with the latest LTO generation of tape.

The generation of the older generation tape is read or determined from data in the cartridge memory. Based on the tape generation, a set of read sensors in each read element is identified. Each data track is then read by having each identified read sensor detect the magnetic transitions in the data track that pass under the read elements, and generate electrical signals. Because of factors such as larger grain sizes, a more uneven distribution of grains, and less precise servo tracking that may be evident in older generations of magnetic tape, the strength of magnetic transitions detected by each read sensor may be different. Methods for determining which set of read sensors to use for a particular tape generation and which read sensor electrical signals to use are described in more detail below.

In certain embodiments, the track data read by each read sensor of a set is buffered, and the first buffered data that passes error detection, based, for example, on the ECC-encoded information read from the tape that is associated with the data track, is used to generate verified track data. In other embodiments, all track data read by the read sensors is combined to produce an aggregate signal, and this data is error checked to generate verified track data. In various embodiments, if the data does not pass error checking, error correction processes using the error correction encoding may be used to generate verified track data.

For purposes of the description, the terms "upper", "lower", "right", "left", "vertical", "horizontal", "top", "bottom", "outer", "inner", and derivatives thereof relate to the disclosed structures and methods, as oriented in the drawing figures. The terms "overlying", "atop", "on top", "positioned on" or "positioned atop" mean that a first element, such as a first structure, is present on a second element, such as a second structure, and intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. As used herein, the term "same," such as "the same width," means nominally identical, such as within industry accepted tolerances, unless the context indicates a different meaning.

FIG. 1A is a functional block diagram of a tape appliance 100, in accordance with an embodiment of the invention. In an exemplary embodiment, tape appliance 100 may be a tape drive. Tape appliance 100 may include several components providing a control and data transfer system for reading and writing data from a host CPU 102, an embodiment of which is described below in relation to FIG. 8, on a magnetic tape medium. By way of example only, those components may include a channel adapter 104, a computer, such as microprocessor controller 106, a data buffer 108, a read/write dataflow circuit 112, a motion control system 110, and a tape interface system 114 that includes a motor driver circuit 116 and read/write heads 118.

Microprocessor controller 106 may provide overall control functionality for the operations of all other components of tape appliance 100. The functions performed by microprocessor controller 106 may be programmable via microcode routines (not shown) according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuit 112, which formats the device data into physically formatted data that may be recorded on a magnetic tape medium. Read/write dataflow circuit 112 is responsible for executing all read/write data transfer operations under the control of microprocessor controller 106. Formatted physical data from read/write dataflow circuit 112 is communicated to tape interface system 114. The latter includes one or more read/write modules in read/write head unit 118, and drive motor components (not shown) for performing forward and reverse movement of a tape medium 120 mounted on a supply reel 122 and a take-up reel 124. The drive components of tape interface system 114 are controlled by motion control system 110 and motor driver circuit 116 to execute tape movements such as forward and reverse recording and playback, rewind and other tape motion functions. In addition, in multi-track tape drive systems, motion control system 110 transversely positions read/write heads 118 relative to the direction of longitudinal tape movement in order to record data in a plurality of tracks.

In various embodiments, during read operations in accordance with the invention, data from a tape track that is read by a plurality of read sensors is received into data buffer 108 via read/write dataflow circuit 112. Microprocessor controller 106 may perform error detection, error correction as may be required, and other signal and data analysis as explained in more detail below, and transmit the track data to host CPU 102 via channel adapter 104.

Figure 1B:
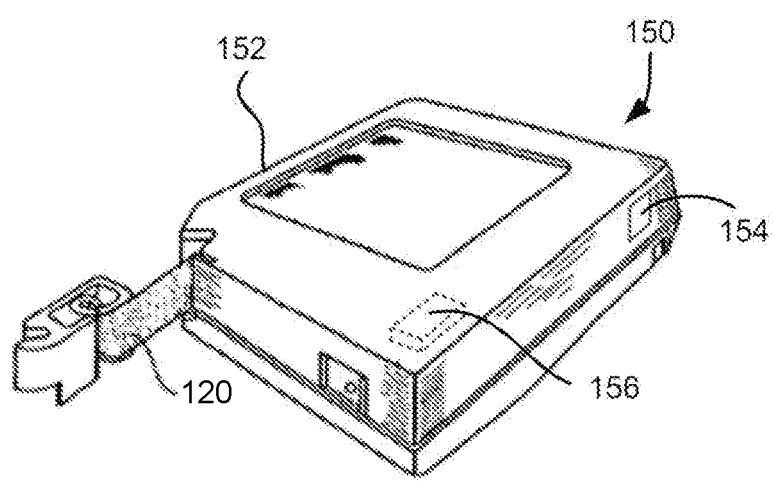
FIG. 1B illustrates an exemplary tape cartridge, in accordance with an embodiment of the present invention.

FIG. 1B illustrates an exemplary LTO tape cartridge 150 according to an embodiment. Tape cartridge 150 may be used with a system such as tape appliance 100. As shown, tape cartridge 150 includes a housing 152, a tape 120 in the housing 152, and a nonvolatile cartridge memory 156 coupled to the housing 152. In some embodiments, the nonvolatile memory 156 may be embedded inside the housing 152. In other embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a flash memory device, ROM device, etc., embedded into or coupled to the inside or outside of the tape cartridge 150. The nonvolatile memory may be accessible by tape appliance 100, and the tape operating software (the driver software) residing on host CPU 102. In an exemplary embodiment, tape cartridge 150 meets the standards specifications of one or more of the LTO generations, such as LTO-7. In such an embodiment, supply reel 122 may be integral to the LTO tape cartridge, and the end of tape 120 includes a leader pin (not shown) which is mechanically grasped by features (not shown) of tape interface system 114 and threaded onto take-up reel 124.

Figure 2A:
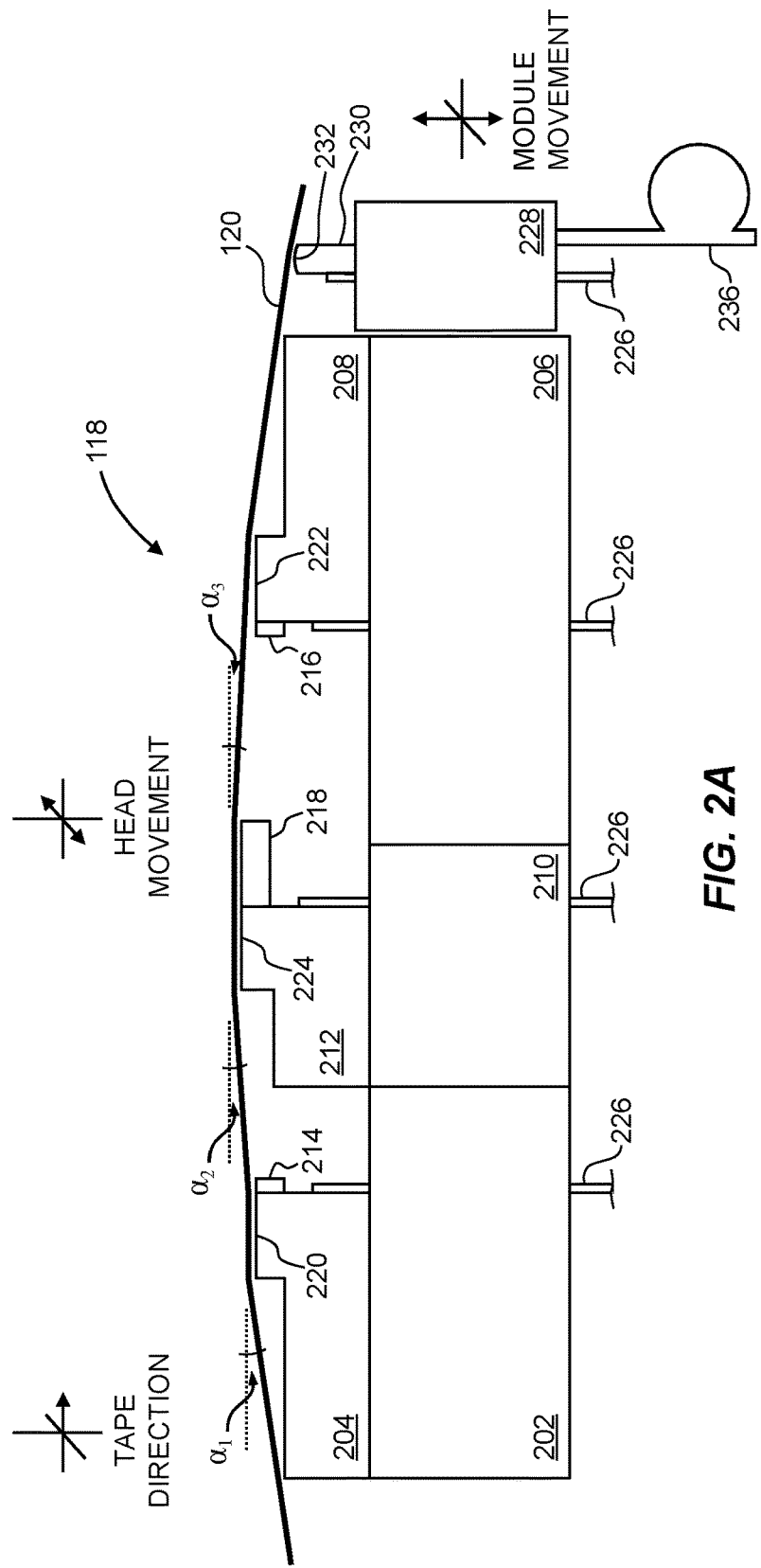
FIG. 2A illustrates a side view of a read/write head, in accordance with an embodiment of the invention.

FIG. 2A illustrates a side view of a read/write head 118 in accordance with an embodiment of the invention. Read/write head 118 includes first, second and third magnetic tape head modules 204, 212, and 208, respectively, mounted to bases 202, 210, and 206, respectively. The bases may be "U-beams" that are physically coupled together. First, second and third modules 204, 212, and 208 each have a tape bearing surface 220, 224, and 222 respectively, which may be flat, contoured, etc. Each module 204, 212, and 208 may be configured for writing and/or reading data, for example, data received from or transmitted to host CPU 102, to and from a tape 120. Modules 204, 212, 208 may receive data for writing and transmit data that is read via cables 226, which may couple the modules to read/write dataflow circuit 112. Note that while the term "tape bearing surface" appears to imply that the surface facing tape 120 is in physical contact with the tape bearing surface, this is not necessarily the case. Rather, the tape may be in physical contact with only a portion of the tape bearing surface, constantly or intermittently, with the tape "flying" above other portions of the tape bearing surface on a layer of air, usually referred to as an "air bearing." By way of explanation, first module 204 can be referred to as the "leading" module as it is the first module encountered by tape 120 when moving from left to right, as illustrated. Second module 212 can be referred to as the "middle" module, and third module 208 can be referred to as the "trailing" module. The leading and trailing modules 204 and 208, respectively, are referred to collectively as outer modules. Note that outer modules 204 and 208 will alternate as the leading module, depending on the direction of travel of the tape 120.

In an exemplary embodiment, closures 214, 218, and 216 are attached to modules 204, 212, and 208, respectively, and serve to extend tape bearing surfaces 220, 224, and 222, and to define gaps at the junctions of the modules and closures in which tape read and write elements, described in more detail below, are disposed. Locating the read and write elements interior to the edges of the tape bearing surfaces may serve to reduce wear and tear of the read/write elements resulting from direct contact from tape 120. Modules 204, 212, and 208, and closures 214, 218, and 216 may be made of a wear resistant substrate material, such as a ceramic. In some embodiments, middle module 212 has a closure, while the outer modules 204, 208 do not. Where there is no closure, preferably a hard coating is added to the module. One preferred coating is diamond-like carbon (DLC).

In one embodiment, tape bearing surfaces 220, 224, and 222 of the first, second and third modules 204, 212, and 208, respectively, lie on approximately parallel planes, with tape bearing surface 224 of the middle module 212 being slightly above tape bearing surfaces 220 and 222 of the outer modules 204 and 208. As described below, this has the effect of creating a desired wrap angle $\alpha_2$ of the tape relative to the tape bearing surface 224 of the middle module 212.

Tape bearing surfaces 220 and 222 may include sharp outer edges, or "skiving" edges, where tape 120 will first contact tape bearing surfaces 220 and 222 when either outer module 204 and 208 is the leading module. The skiving edges serve to "shear" air from the underside of tape 120 to prevent air from being drawn into the head-tape gap by the tape, so that atmospheric pressure may push the tape into substantially full contact, i.e., with a small tape fly height, over the longitudinal dimension, with respect to tape direction, of the tape bearing surfaces. A small amount of roundness or slope at the incoming edge may generate an unacceptably thick air bearing, separating the tape from the head, and its read/write elements, as described below, and present problems in reading and writing high density recordings due to spacing loss effects.

Where the tape bearing surfaces 220, 224, and 222 lie along approximately parallel offset planes, the vacuum created by the skiving edge of tape bearing surface 220 of the leading module 204 results in the trailing edge of tape bearing surface 220 (the edge from which the tape leaves the leading module 204) being the approximate reference point which defines the wrap angle $\alpha_2$ over the tape bearing surface 224 of the second module 212. Because the tape stays in close proximity to tape bearing surface 220 until close to its trailing, read and/or write elements, described in more detail below, may be located near the trailing, or inner, edges of the outer modules 204, 208.

A benefit of this and similar embodiments is that, because the tape bearing surfaces 220 and 222 of outer modules 204, 208 are fixed at a determined vertical offset from the tape bearing surface 224 of the middle module 212, the inner wrap angle $\alpha_2$ is fixed when modules 204, 212, and 208 are physically coupled together or are otherwise fixed into a head assembly. The inner wrap angle $\alpha_2$ is approximately $\tan^{-1}(\delta/W)$ where $\delta$ is the height difference between the planes of the tape bearing surfaces 220 and 224, and W is the width between the opposing ends of the tape bearing surfaces 220 and 224. An illustrative inner wrap angle $\alpha_2$ is in a range of about 0.5° to about 1.1°, though can be any angle that is advantageous to a design. Beneficially, the inner wrap angle $\alpha_2$ on the side of middle module 212 receiving the tape (leading edge) will be larger than the inner wrap angle $\alpha_3$ on the trailing edge, as the tape 120 rides above tape bearing surface 222 of trailing module 208. This difference is generally beneficial as a smaller $\alpha_3$ tends to oppose what has heretofore been a steeper exiting effective wrap angle.

Note that the tape bearing surfaces 220, 222 of the outer modules 204, 208 are positioned to achieve a negative wrap angle at the trailing edge of the tape bearing surface 220 of the leading module 204. This is generally beneficial in helping to reduce friction due to contact with the trailing edge, provided that proper consideration is given to the location of the "crowbar" region, where the tape forms a slight bubble, that forms in the tape where it peels off the head. This negative wrap angle also reduces flutter and scrubbing damage to the elements on leading module 204. Further, at trailing module 208, tape 120 flies over the tape bearing surface 222 so there is virtually no wear on the elements when tape is moving in this direction. Particularly, tape 120 entrains air and so will not significantly ride on the tape bearing surface 222 of the trailing module 208 (although some contact may occur). This is permissible in certain embodiments, for example, where the leading module writes onto the tape, the middle module may perform a read-after-write function, and the trailing module 208 is idle.

Writing and reading functions may be performed by different modules at any given time. In one embodiment, middle module 212 includes a plurality of data readers and optional servo readers and no data writers. Outer modules 204, 208 may include a plurality of writers and no readers, with the exception that outer modules 204, 208 may include optional servo readers. The servo readers may be used to laterally position the head, with respect to tape direction, during reading and/or writing operations.

In the embodiment illustrated in FIG. 2A, modules 204, 212, 208 each have a closure 214, 218, 216, which extends the tape bearing surface of the associated module, thereby effectively positioning the read/write elements away from the edge of the tape bearing surface. Closure 218 on middle module 212 can be a ceramic closure of a type typically found on tape heads. The closures 214, 216 of the outer modules 204, 208, however, may be shorter than closure 218 of middle module 212 as measured parallel to a direction of tape travel over the respective module. This enables positioning the modules closer together. One way to produce shorter closures 214, 216 is to lap the standard ceramic closures of the second module 212 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 214, 216 or no closures on the outer modules 204, 208, the write-to-read gap spacing can be reduced to less than about 1 mm, e.g., about 0.75 mm. The open space between the modules 204, 212, 208 can still be set to approximately 0.5 to 0.6 mm, which in some embodiments is ideal for stabilizing tape motion over the middle module 212.

In alternative embodiments, depending on tape tension and stiffness, it may be desirable to angle the tape bearing surfaces of the outer modules 204, 208, relative to the tape bearing surface of the middle module 212. For example, the tape bearing surfaces of the outer modules may be about parallel to the tape at the desired wrap angle $\alpha_2$ of the middle module. In other words, the planes of the tape bearing surfaces of the outer modules are oriented at about the desired wrap angle $\alpha_2$ of the tape relative to the middle module. The tape will also pop off of the trailing module in this embodiment, thereby reducing wear on the elements in the trailing module. These embodiments are particularly useful for write-read-write applications. Additional aspects of these embodiments are similar to those given above.

In operation, as tape 120 passes over the read and write elements in tape bearing surfaces 220, 224, 222 of read/write head 118, motion control system 110 transversely positions read/write heads 118 relative to the direction of longitudinal tape movement in order to read data from or write data to the data tracks in a particular data band of tape 120, as will be described in more detail below.

In an exemplary embodiment, read/write heads 118 also includes a special purpose supplemental magnetic tape head module 230 on a mount 228. Supplemental module 230 may be used to read data from older generation LTO tapes that are no longer compatible with the generation of the tape appliance, as briefly described above, and tape head modules 204, 212, 208 may, for example, be used for a production workload. In this embodiment, modules 204, 212, and 208 are configured for a particular LTO generation, such as the latest generation, and are used, for example, for standard production workloads using LTO tape cartridges also of the latest LTO generation. When it is desired to retrieve data from an older generation LTO tape that is no longer compatible with the latest generation, supplemental module 230 would be used.

A cable 226 may couple supplemental module 230 to read/write dataflow circuit 112 for transmitting data read by the supplemental module. In certain embodiments of the invention, supplemental module 230 is coupled to the modules of read/write heads 118 such that supplemental module 230 follows the lateral movements of modules 204, 212, 208, and additionally may independently move at least along an axis perpendicular to the plane of the tape above tape bearing surface 232 of the supplemental module. Generally, this movement can be referred to as "vertical" movement. Thus, although the vertical movement of supplemental module 230 may not be strictly perpendicular to the plane of the tape above the supplemental module, at least one component of the movement is perpendicular to the plane of the tape, such that vertical movement of module 230 will bring tape bearing surface 232, and the read elements therein, as described in more detail below, into and out of physical engagement with tape 120.

Actuation of the vertical movement of supplemental module 230 may be performed, for example, by a precision servo mechanism 236 coupled to base 228 of supplemental module 230, controlled by motion control system 110 and microprocessor controller 106, and, optionally by host CPU 102. To ensure that supplemental module 230 precisely follows the lateral movements of modules 204, 212, 208, base 228 of the supplemental module may, for example, be coupled directly to base 206, via a tongue-and-groove arrangement, a dovetail-rail arrangement, or another suitable structure or arrangement that allows vertical movement of supplemental module 230 while ensuring that supplemental module 230 precisely follows the lateral movements of modules 204, 212, 208. Base 228 may alternatively, or additionally, be indirectly coupled to modules 204, 212, 208 by, for example, being coupled to a common support structure. For example, the axis of vertical movement of supplemental module 230 may be controlled by a shaft- and hole arrangement, with one component integral to the common support, and the other integral to base 228. In other embodiments, supplemental module 230 may not be tightly coupled to modules 204, 212, 208, and may perform track following functions, under control, for example, of motion control system 110, independent of modules 204, 212, 208, as may be known in the art.

Figure 2B:
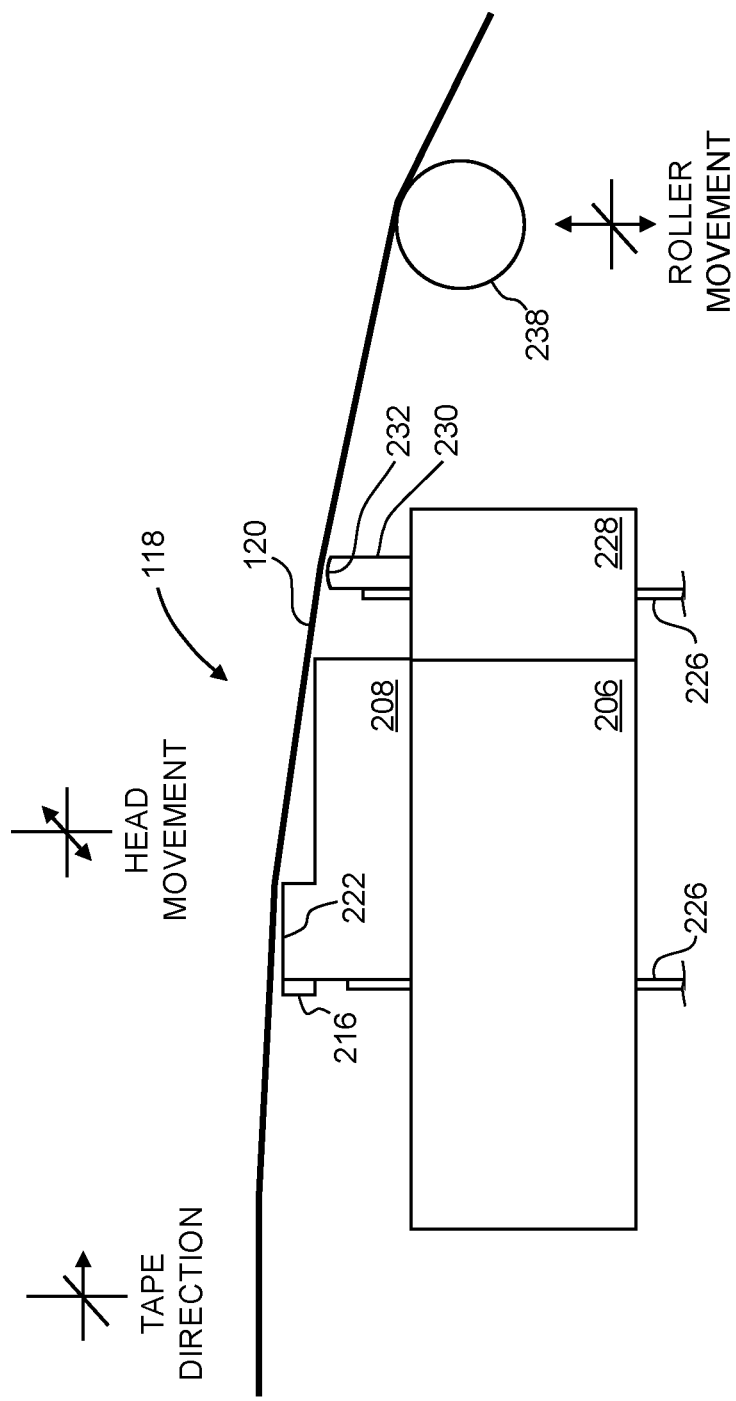
FIG. 2B illustrates a side view of a read/write head, in accordance with another embodiment of the invention.

In an alternative embodiment, illustrated in FIG. 2B, supplemental module 230 may be fixed in relation to modules 204, 212, 208, and tape 120 may be lifted off of, or lowered onto, tape bearing surface 232 of the supplemental module. For example, a precision controlled roller or guide 238, disposed along the tape path between supplemental module 232 and, for example, a capstan/pinch roller assembly (not shown), may lift and lower tape 120, under the control of motion control system 110, microprocessor controller 106, and, optionally, host CPU 102. With respect to the aspect of embodiments in which tape 120 periodically engages supplemental module 230, this alternative embodiment may satisfactorily implement this aspect. In a further embodiment, a combination of vertically moving supplemental module 232 and lifting and lowering tape 120 may also satisfy this aspect. In general, any arrangement which allows for tape 120 to periodically engage supplemental module 230, in accordance with embodiments of the invention, may be used.

When supplemental tape 120 is engaged with supplemental module 230, sufficient pressure is exerted by the supplemental module on the tape to ensure a satisfactory contact of the tape with tape bearing surface 232, in which read elements are disposed. As mentioned above, this contact might be direct physical contact, or may include all or a portion of the tape flying over tape bearing surface 232 on an air bearing thin enough for data to be read from the tape. This pressure may depend on such factors as the relative geometries of tape bearing surface 232 and tape 120, an acceptable thickness of an air bearing, an acceptable amount of actual contact under pressure between the tape and the tape bearing surface, tape asperity, etc. In various embodiments, the tape pressure on tape bearing surface 232, as well as the tape pressure on tape bearing surfaces 220, 224, 222, may range, for example from 10 to 100 kPa.

An advantage of the module arrangement described just above may be that supplemental module 230 is engaged with tape 120 only when needed. This may serve to reduce wear on supplemental module 230 due to tape abrasion at tape bearing surface 232. In other embodiments, however, supplemental module 230 may be fixedly coupled to 204, 212, 208, and tape 120 may be in substantially in constant physical engagement with supplemental module 230. An advantage of this module arrangement may be a simplification of read/write head 118 in that the additional servo mechanisms required to independently move supplemental module 230 relative to modules 204, 212, 208 would not be required.

An advantage of including supplemental module 230 with modules 204, 212, 208 in an integrated read/write head 118 arrangement may be that to produce such a tape appliance, there is only the expenses associated with the incremental addition of supplemental module 230 to read/write head 118.

However, in still other embodiments, tape appliance 100 may be dedicated to only to reading older generations of LTO tapes, and read/write head 118 may only include a single read head in accordance to supplemental module 230. An advantage to this arrangement may be that a tape appliance otherwise needed for production workload is not being used for another purpose. Further, such a special purpose tape appliance may have the advantage of relatively easier upgrade by, for example, swapping out of the supplemental module 130, and applying a firmware update to microprocessor controller 106.

Figure 3:
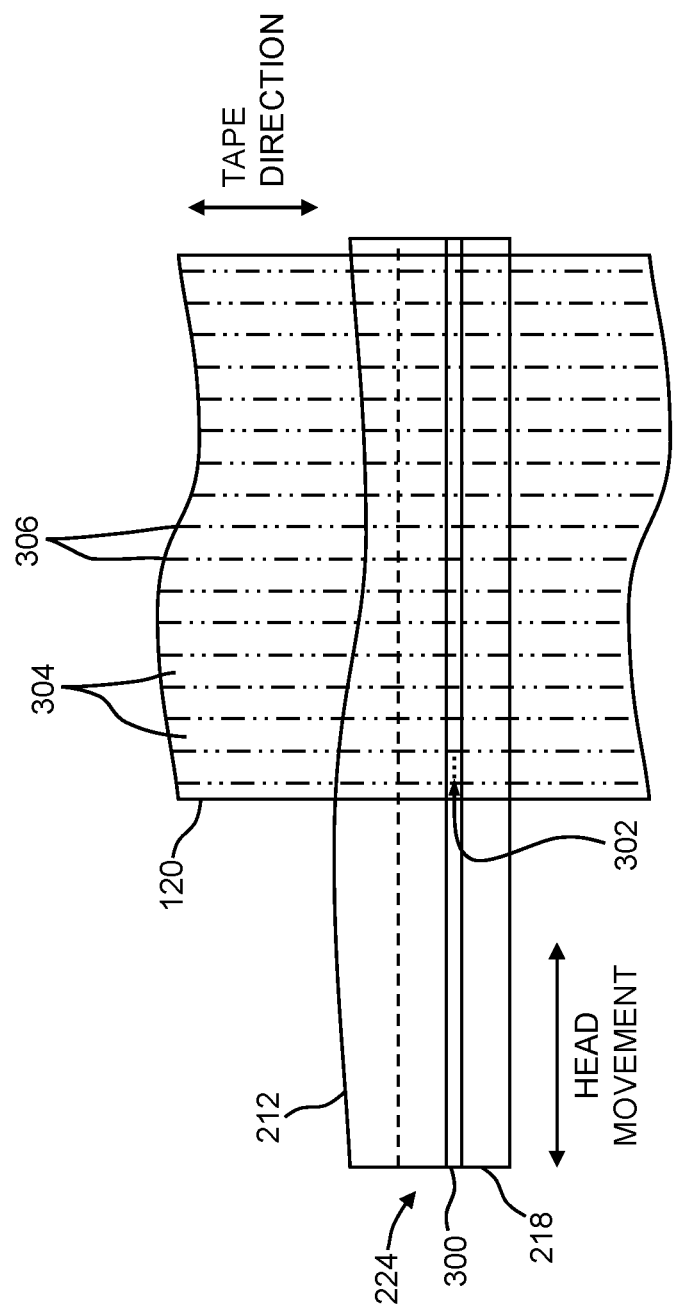
FIG. 3 illustrates a representative tape bearing surface of a module, in accordance with an embodiment of the present invention.

FIG. 3 illustrates a representative tape bearing surface 224 of module 212, from the perspective of a downward view, in accordance with an embodiment of the present invention. A representative tape 120 is shown, with servo tracks 306 indicated as dashed lines, and data bands 304 between the servo tracks 306. In this illustrative example, tape 120 includes 4 to 22 data bands 304, e.g., with 16 data bands 304 and 17 servo tracks 306, on a one-half inch wide tape 120. Each data band may include a number of data tracks, for example 1024 data tracks (not shown). During read/write operations, read and/or write elements of read/write element array 302, disposed in a gap 300 of tape bearing surface 224 of module 212 where the tape bearing surface of closure 218 abuts module 224, are positioned to specific track positions within one of the data bands 304. Outer read elements of read/write element array 302, which may be referred to as servo readers, read the servo tracks 306. The servo signals generated by the servo readers and received by motion control system 110 are used to align the read and/or write elements 302 with a particular set of data tracks during read/write operations.

Figure 4:
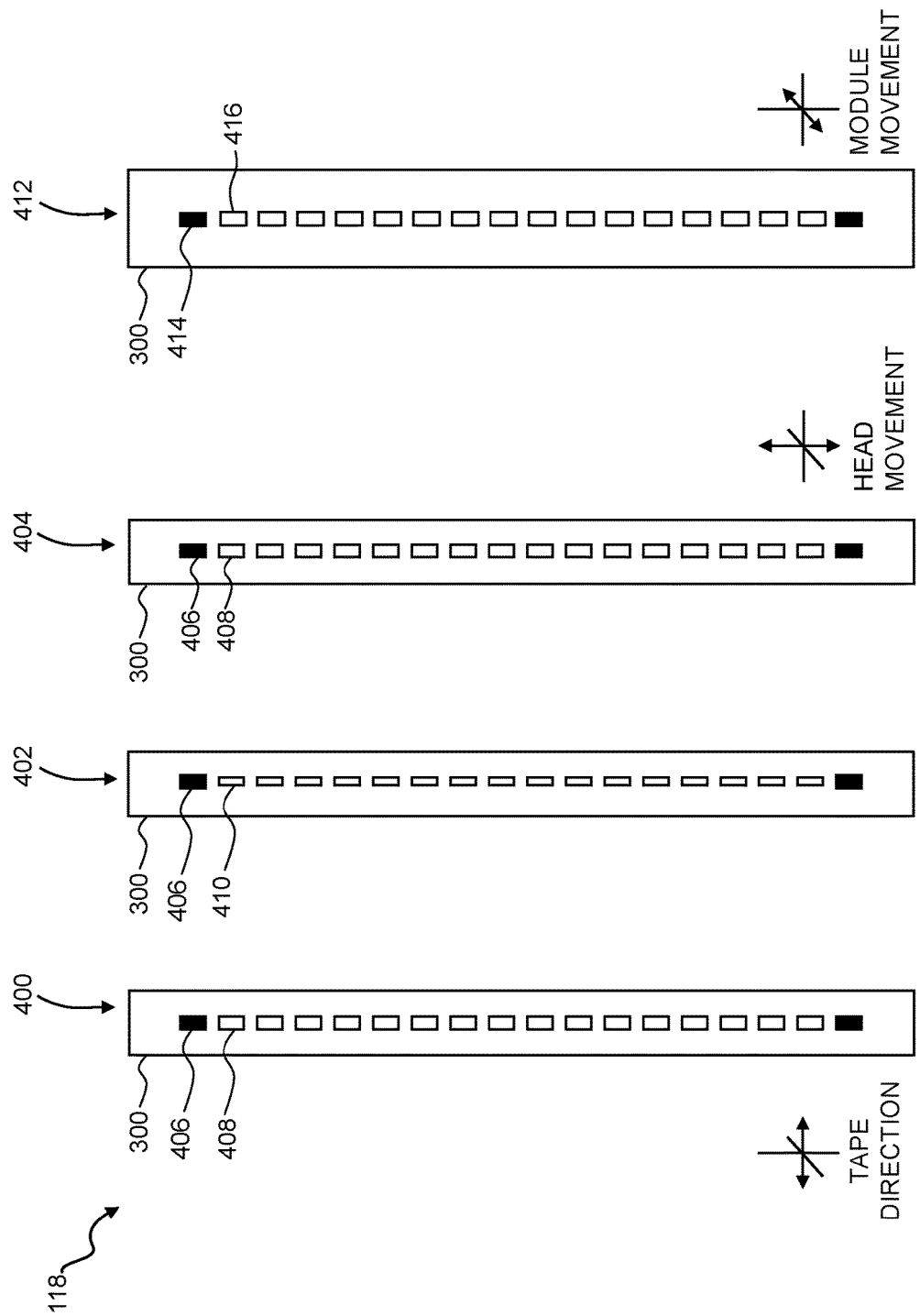
FIG. 4 illustrates read and write element arrays, in accordance with an embodiment of the present invention.

FIG. 4 depicts read and write element arrays 400, 402, 404, and 412 of read/write heads 118, which may be formed, for example, in gaps 300 of the tape bearing surfaces of modules 204, 212, 208, and supplemental module 228, respectively. In the illustrated embodiment, the element arrays 400, 402, 404 are arranged in a RWR configuration, although other embodiments are possible. For example, the element arrays can be arranged differently, such as in a WRW configuration, or other configurations as may be required for the particular application or use. These arrays may be considered to be for the production workload. As shown, the read and write element arrays 400 and 404 may include, for example, 16 read elements 408 and two servo readers 406, and write element array 402 may include 16 write elements 410 and two servo readers 406. In other embodiments, the number of read and write elements may include 8, 16, 32, 40, or 64 active read and/or write elements per array, and alternatively interleaved designs having odd numbers of read or write elements such as 17, 25, 33, etc. An illustrative embodiment includes 32 read elements per array and/or 32 write elements per array, where the actual number of transducer elements could be greater, e.g., 33, 34, etc. This may allow the tape to travel more slowly, thereby reducing speed-induced tracking and mechanical difficulties and/or execute fewer "wraps" to fill or read the tape.

Read element array 412 represents the read element array included in supplemental module 230. Here, each read element 416 represent a set of read elements arranged in a manner described in more detail below with respect to FIGS. 6A and 6B. The array 412 also includes servo read elements 414. Read elements 416 and servo read elements 414 as illustrated represent various arrangements of read elements in accordance with embodiments of the invention, such that tapes in accordance with one or more older LTO generations can be read.

Figure 5A:
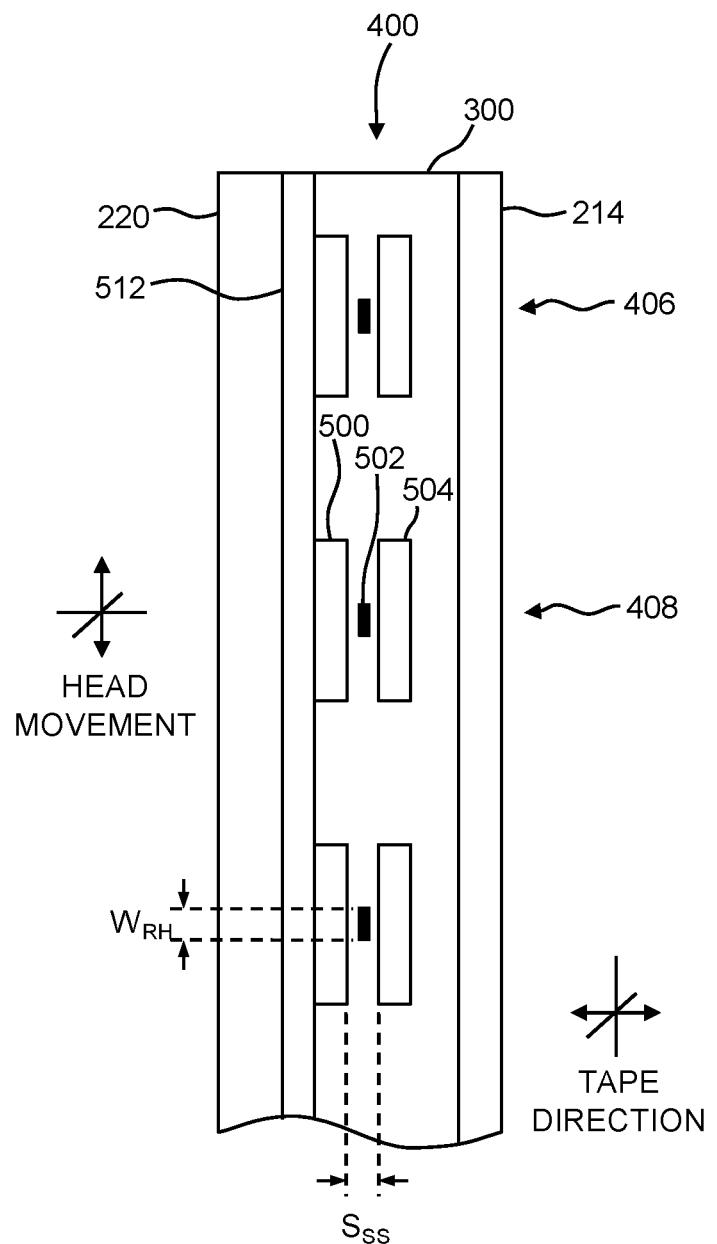
FIG. 5A illustrates a representative partial tape bearing surface of a production read head, illustrating a read element array in additional detail, in accordance with an embodiment of the present invention.

FIG. 5A shows a representative partial tape bearing surface 220 of read module 204, illustrating additional details of the read elements of read element array 400, from the perspective of a downward view, in accordance with an embodiment. A read element array 400 includes one or more servo read elements 406 and a plurality of read elements 408 on the substrate material of module 204 and an optional electrically insulative layer 512. The read elements as shown are linearly aligned in a direction generally perpendicular to the direction of tape travel. However, the read elements may also be aligned diagonally, in multiple rows, etc. Servo readers 406 are positioned on the outside of the array of read elements 408. The tape bearing surface 222 of read module 208, and its read element array 404, are configured in essentially the same way. Read sensor width $W_{RH}$, and read sensor shield-to-shield spacing $S_{SS}$ may be optimized for track density, linear density (bits/inch), head-to-tape spacing, and/or other physical and magnetic properties of a particular generation of LTO tape. In an exemplary embodiment, shield-to-shield spacing $S_{SS}$ may have a nominal value derived from the linear bit spacing, and read sensor width $W_{RH}$ may have a nominal value of 30%-80% of the track width.

Figure 5B:
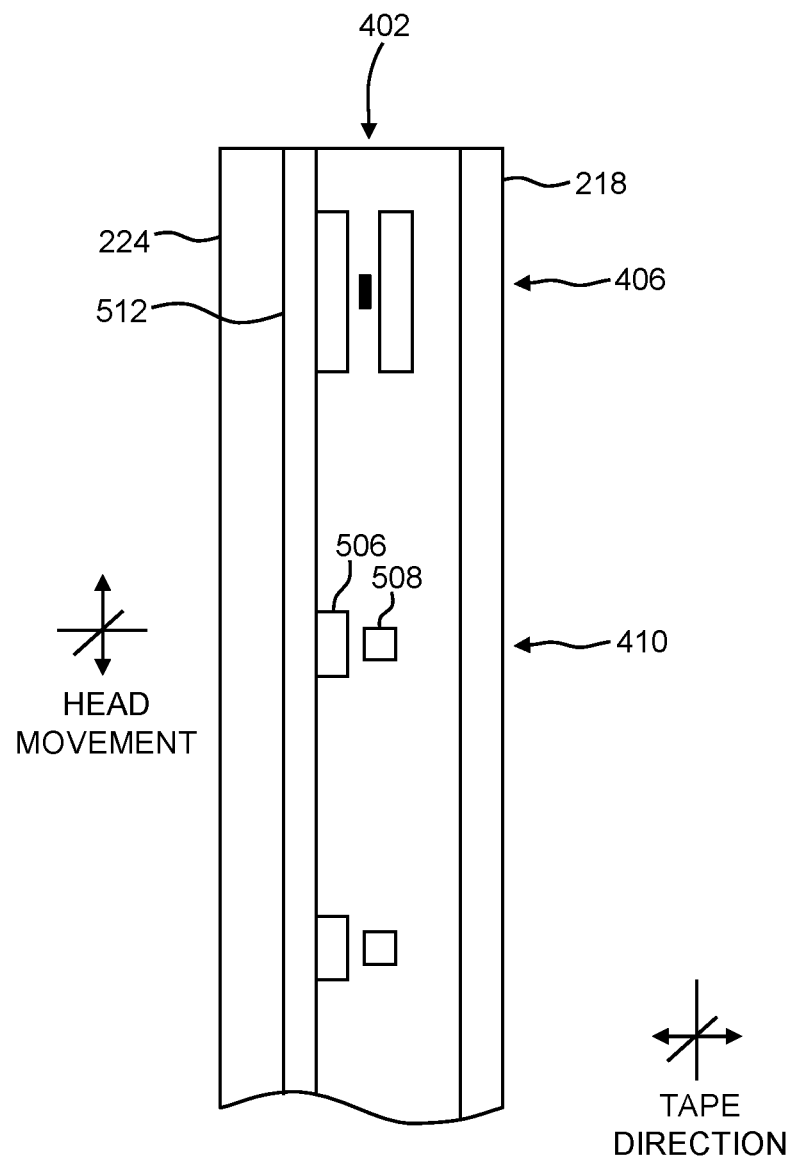
FIG. 5B illustrates a representative partial tape bearing surface of a production write head, illustrating a write element array in additional detail, in accordance with an embodiment of the present invention.

FIG. 5B shows a representative partial tape bearing surface 224 of write module 212, illustrating additional details of the write elements of write element array 402, from the perspective of a downward view, in accordance with an embodiment. Write element array 402 includes one or more servo read elements 406 and a plurality of write elements 410 on the substrate material of module 212 and an optional electrically insulative layer 512. The write elements as shown are linearly aligned in a direction generally perpendicular to the direction of tape travel. However, the write elements may also be aligned diagonally, in multiple rows, etc. Servo readers 406 are positioned on the outside of the array of write elements 410.

Generally, the magnetic tape medium moves transversely across read and write element arrays 400, 402, 404, and 412 (described in more detail below), in either direction, and read/write heads 118 may be moved laterally, with respect to the tape direction, between data tracks and data bands 304 on the tape. The magnetic tape medium and read element arrays 400 and 404 operate in a transducing relationship in a manner known in the art.

In an embodiment, when a read module is constructed, for example, read module 204, layers are formed in the gap 300 created above the electrically conductive substrate material of module 204, e.g., of AlTiC, in generally the following order for the read elements 408, and similarly for servo readers 406: an insulating layer 512; a first shield 500 typically of an iron alloy such as NiFe, CZT or Al—Fe—Si (Sendust); a sensor 502 for sensing a data track on a magnetic medium of any known type, including those based on magnetoresistance (MR), giant MR (GMR), anisotropic MR (AMR), tunneling MR (TMR), etc.; and a second shield 504 typically of a nickel-iron alloy (e.g., ~80/20 at % NiFe, also known as permalloy)

Similarly, when a write module is constructed, for example, write module 208, layers are formed in the gap 300 created above the electrically conductive substrate material of module 208, in generally the following order for the write elements 410: first and second writer pole tips 506, 508, and a coil (not shown). First and second writer poles 506, 508 may be fabricated from high magnetic moment materials such as ~45/55 NiFe. In preferred embodiments, due to its high magnetoresistive change and superior signaling characteristics, read elements are TMR sensors.

Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc. Materials and construction of read elements 406 and 408 may be directed to a specific generation of LTO tape media, and may be optimized for a degree of longevity, to reduce buildup of debris, and/or other performance considerations.

Figure 6A:
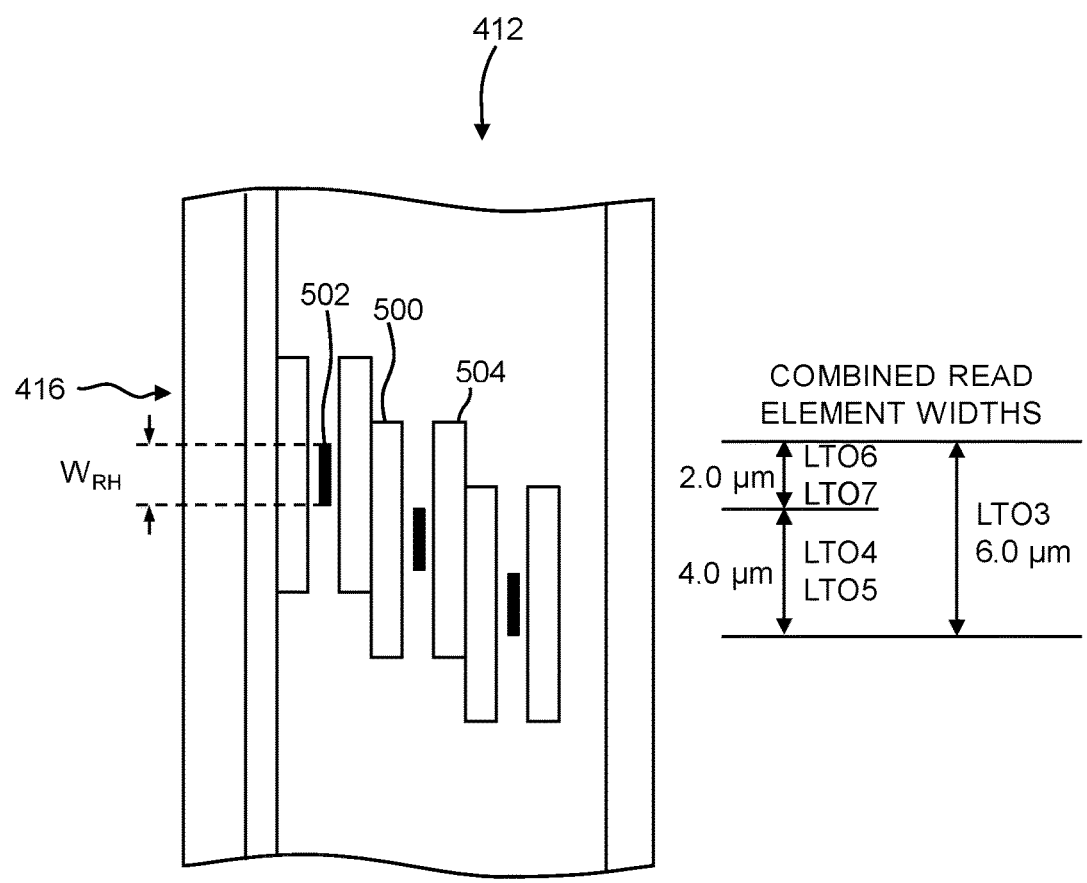
FIG. 6A illustrates a representative partial tape bearing surface of a supplemental read head, illustrating a read element array in additional detail, in accordance with an embodiment of the present invention.
Figure 6B:
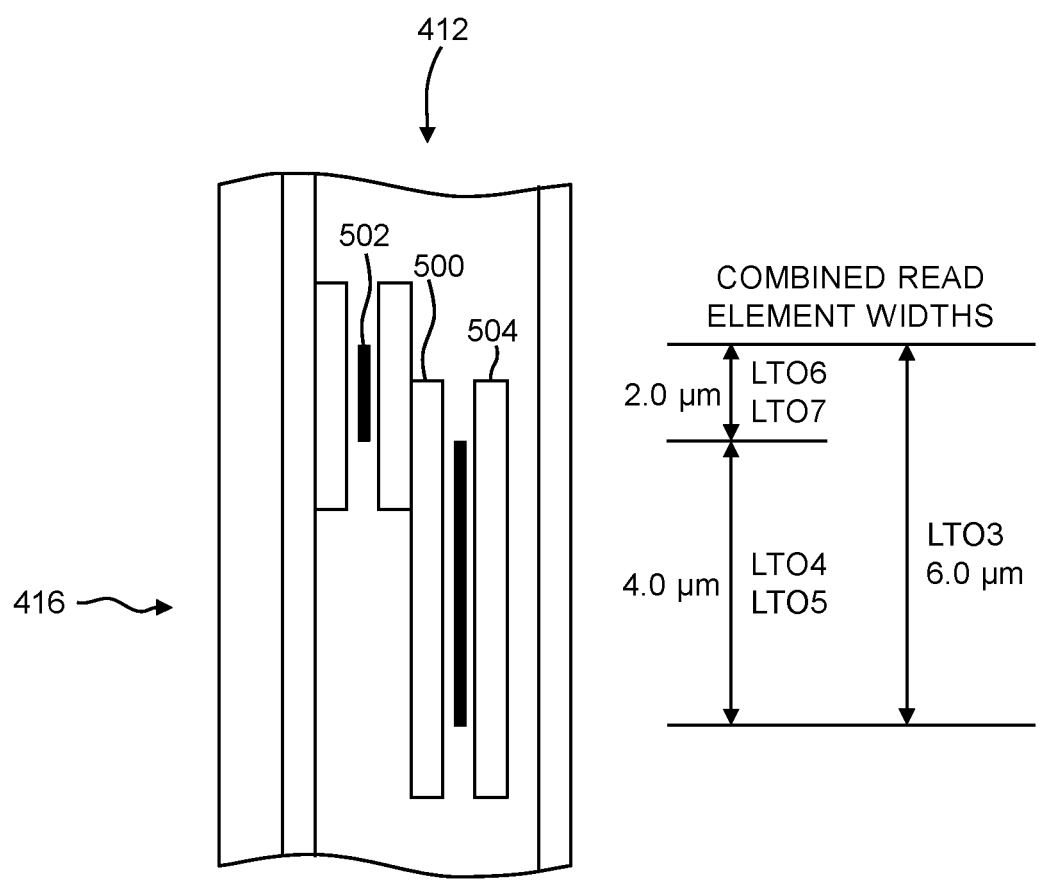
FIG. 6B illustrates a representative partial tape bearing surface of a supplemental read head, illustrating a read element array in additional detail, in accordance with a second embodiment of the present invention.

FIGS. 6A and 6B illustrate example embodiments of a read element 416 of read element array 412 of supplemental module 230. The array comprises a plurality of read elements 416, each of which includes a plurality of read sensors 502. Construction of read element array 412 would be in a similar manner as described above for read element arrays 400 and 404 of read modules 204 and 208, but need not be exactly the same. For example, as illustrated, each read element has a pair of shields 500/504. In certain embodiments, adjacent read elements may utilize a common shield between the elements. As mentioned above, in an exemplary embodiment, the read elements 416 are arranged such that data written to tape in accordance with one or more previous LTO generations can be read.

As illustrated, read element 416 in FIGS. 6A and 6B represent a portion of read element array 412 for reading data from a single data track of an LTO tape. FIG. 6A illustrates a representative embodiment in which all read sensors 502 have the same width ($W_{RH}$). FIG. 6B illustrates a representative embodiment in which the read sensors 502 have varying widths. As will be described in more detail below, the embodiments illustrated in FIGS. 6A and 6B are configured to read data written to tapes in accordance with the LTO3, LTO4, LTO5, LTO6, and LTO7 standards. The particular read sensor widths and the number of read sensor rows of read element array 412 depends on such factors as the desired previous generations to be read, and design, manufacturing, technology, cost considerations, etc.

In an exemplary embodiment, read sensors 502 are configured such that there will be no gaps between the read sensors in the cross-track direction for read sensors designated to read data for a particular LTO generation, although the read sensors may be offset in the direction of tape travel, for example in three rows, as illustrated in FIG. 6A, or two rows, as illustrated in FIG. 6B.

In an exemplary embodiment, the combination of read sensors that will be capable of reading a range of LTO generation tapes may be determined as follows. For the LTO tapes and appliances, tape track pitch may be represented by $W_{TP}$, read head width may be represented by $W_{RH}$, write head width may be represented by $W_{WH}$. The track following margin $W_M$ for a data track is defined as $W_M = W_{TP} - W_{RH}$.

The parameters for a "k-th" generation drive may be designated by appending "[k]" to the parameter. For example, the third-generation read head width may be represented by $W_{RH}$ [3]. The oldest LTO generation is represented by "1", and the latest generation by "n." Thus, for purposes of discussion, the relationship of 1≤k≤n holds true. Parameters that are useful when examining the backward compatibility of reading a k-th generation tape by an n-th generation drive are $W_{TP}[k]$ and $W_{RH}[k]$.

With regard to track following margin $W_M$, older LTO generations have a narrower read head $W_{RH}$ relative to their track pitch $W_{TP}$ than that of a more recent generations, and thus a smaller track following margin $W_M$. This may be attributed to the fact that for newer generations of LTO tape drive technology, the track following function of the tape head modules is improved such that the head can be more accurately controlled with respect to the target position.

For a given tape drive, the same track following function may be used for writing and reading. The margins at the time of writing and reading may be allowable up to $W_M[k]/4$. As long as the positional deviation of the heads takes place within this range, the read head should pass above the written data. Accordingly, the range in which valid data written may be given as:

$$W_V[k] = W_{TP}[k] - \frac{W_M[k]}{4} = \frac{3W_{TP}[k] + W_{RH}[k]}{4}.$$

As shown in Table 2, an LTO tape drive can read data from a tape that is written in accordance with at least the previous LTO generation (with the exception, of course, of an LTO1 generation tape drive). Stated differently, a tape drive in accordance with LTO generation [k+1] can at least read tapes written in accordance with LTO generation [k]. As a result, if the head width resulting from combining multiple read elements for the k-th generation is given as $W_C[k]$, then the conditions which $W_C[k]$ should satisfy will be as follows:

(i) $W_C[k]$ is wider than the read head width $W_{RH}[k+1]$ of the read head of the drive of the next generation "k+1" following the generation "k" of the tape from which data will be read.

(ii) $W_C[k]$ is narrower than the width obtained by subtracting the margin $W_M[n]/4$ at the time of reading of data by the latest generation "n" drive from the effective data range $W_v[k]$ at the time of writing of data using a tape of the generation "k" from which data should be read.

Therefore, in order to read a tape written by a k-generation drive, the following relationship should be satisfied:

$$W_{RH}[k+1] \leq W_C[k] \leq W_v[k] - W_M[n]/4$$

When the right-hand side is expanded:

$$W_V[k] - \frac{W_M[n]}{4} = \frac{3W_{TP}[k] + W_{RH}[k]}{4} - \frac{W_{TP}[n] - W_{RH}[n]}{4} = \frac{W_{RH}[k] + W_{RH}[n]}{4} + \frac{3W_{TP}[k] - W_{TP}[n]}{4}$$

When the inequality signs are taken into account, the upper and lower limits of $W_v[k]$, the valid width range for a read element width for a given LTO generation [k], can be determined. Table 3 shows the upper and lower limit values of $W_v[k]$ for LTO tape generations LTO-3 through LTO-7.

From Table 3, one or more combinations of LTO generation read elements can be selected to satisfy a requirement to read data from a one or more LTO generation tapes. Returning to FIG. 6A, it can be seen that a grouping of three read sensors in accordance with LTO-7 generation specifications, when fabricated into a read head, can read data tracks from tapes written in accordance with LTO generations LTO3 through LTO7. As illustrated, electrical signals from a single read sensor can be read for LTO7 and LTO6 generation tapes, as the read sensor has a nominal width of 2.0 μm, in accordance with LTO7 specifications. As shown in Table 3, the lower limit for a read element width for an LTO6 generation tape is 2.0 μm. Thus, a read sensor in accordance with LTO7 specifications can be used to read data written to a tape in accordance with LTO6 specifications. This may also be deduced from Table 2, in which it is indicated that tape drives in accordance with LTO7 specifications are read-compatible with LTO6 and LTO5 tapes.

TABLE 3

VALID READ ELEMENT WIDTH RANGE ($W_r[k]$)

|  | LTO-3 | LTO-4 | LTO-5 | LTO-6 | LTO-7 |
|---|---|---|---|---|---|
| Track pitch (μm) | 14.3 | 11.5 | 8.1 | 4.75 | 2.88 |
| Read head width (μm) | 6.0 | 5.0 | 4.0 | 3.0 | 2.0 |
| Lower limit $W_{RH}[k + 1]$ | 5.0 | 4.0 | 3.0 | 2.0 | N/A |
| Upper limit $W_P[k]$ – $W_M[n]/4$ | 12.08 | 9.73 | 6.93 | 4.17 | N/A |

Two adjacent read sensors can be used to read data tracks written in accordance with LTO generations LTO4 and LTO5. The combined width for two read sensors is 4.0 μm. As indicated in Table 3, this value is within the valid lower limits and upper limits of both LTO4 and LTO5 generation tapes. Similarly, three adjacent read sensors, having a combined width of 6.0 μm, can be used to read tapes written in accordance with LTO3 specifications.

FIG. 6B illustrates an embodiment in which a combination of two read sensors having different widths may be used to read data tracks from tapes written in accordance with LTO generations LTO3 through LTO7.

As illustrated in FIGS. 6A and 6B, different combinations of read sensors having the same or different widths may be used to read data tracks in accordance with a range of LTO generations, as long as a combined width of one or more adjacent read sensors falls within the upper and lower valid read element widths, as indicated in Table 3. In this embodiment, the particular choice of read sensors to combine is a design decision based on such factors as cost, read array fabrication considerations, a desired coverage within the upper and lower valid read element widths, etc.

In read array 412, each read element 416 is configured the same to allow for proper read tracking across all wraps. The servo control system is configured and operated to align the selected read sensors 502 in each read element 416 for accurate tracking within each data band.

While an exemplary embodiment is described above, other embodiments of the invention are possible. In the exemplary embodiment, a particular method for determining the upper and lower limits for the combined read sensor widths, based on track margin, is described. This method, based on theoretical and experimental results, should provide accurate track data with an acceptably low bit error rate, for example, within a commonly accepted industry bit error rate for the particular technology. In other embodiments, the combined width of the selected read sensors for a given LTO generation can be wider or narrower than in the exemplary embodiment as long as useful data can be read from the tape. Similarly, gaps between read sensors in the cross-track direction may be acceptable as long as useful data can be read from the tape. Further, the read head widths shown in FIGS. 6A and 6B are based on LTO standards. Using LTO standard widths may assist in keeping manufacturing costs down. In alternative embodiments, non-standard read head widths can be used. In addition shield-to-shield spacing may be adjusted, depending on the LTO generations desired to be read, to optimize single-bit reading across all these LTO generations. The particular configuration of read sensors in each read element is a design decision based on such factors as cost, read element and read sensor fabrication considerations, read sensor technologies, acceptable bit error rates, etc.

Figure 7:
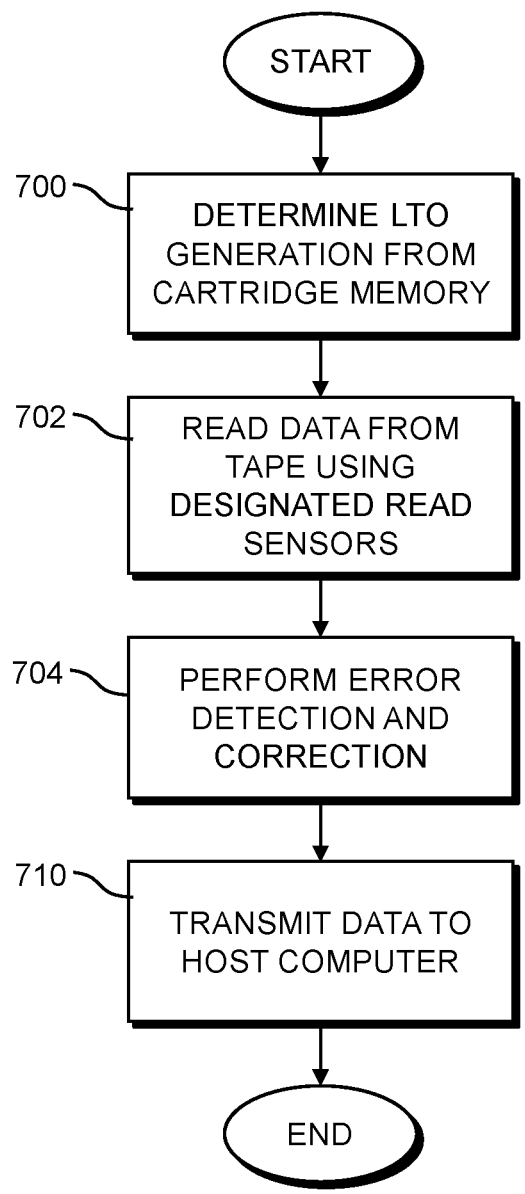
FIG. 7 illustrates a flowchart depicting steps a tape appliance may perform, in accordance with a second embodiment of the present invention.

FIG. 7 is a flowchart illustrating the steps a tape appliance may perform, in accordance with an embodiment of the invention. When host CPU 102 requests tape appliance 100 to load a tape cartridge 150 for reading, the tape appliance determines the LTO generation of the tape cartridge by retrieving this information from cartridge memory 156 (step 700).

Based on the LTO generation of the tape cartridge 150, microprocessor controller 106 determines which read modules 204, 208, 230 will be used (step 702). If the tape cartridge 150 is the same LTO generation as the tape appliance 100, or is one generation previous, production read head modules 204 and 208 may be used to read data from the tape 120. If the LTO generation of the tape cartridge 150 is two or more generations previous, supplemental module 230 is used to read data from the tape 120. Based on the particular arrangement of read sensors 502 in each read element 416 of read element array 412 of supplemental module 230, data will be read from data bands 304 using a predetermined selection of the read sensors.

As the data from the data bands 304 is read, it is buffered into data buffer 108, and error detection and correction functions are performed (step 704). When the data has been verified, it is transmitted to host CPU 102 (step 710).

Figure 8:
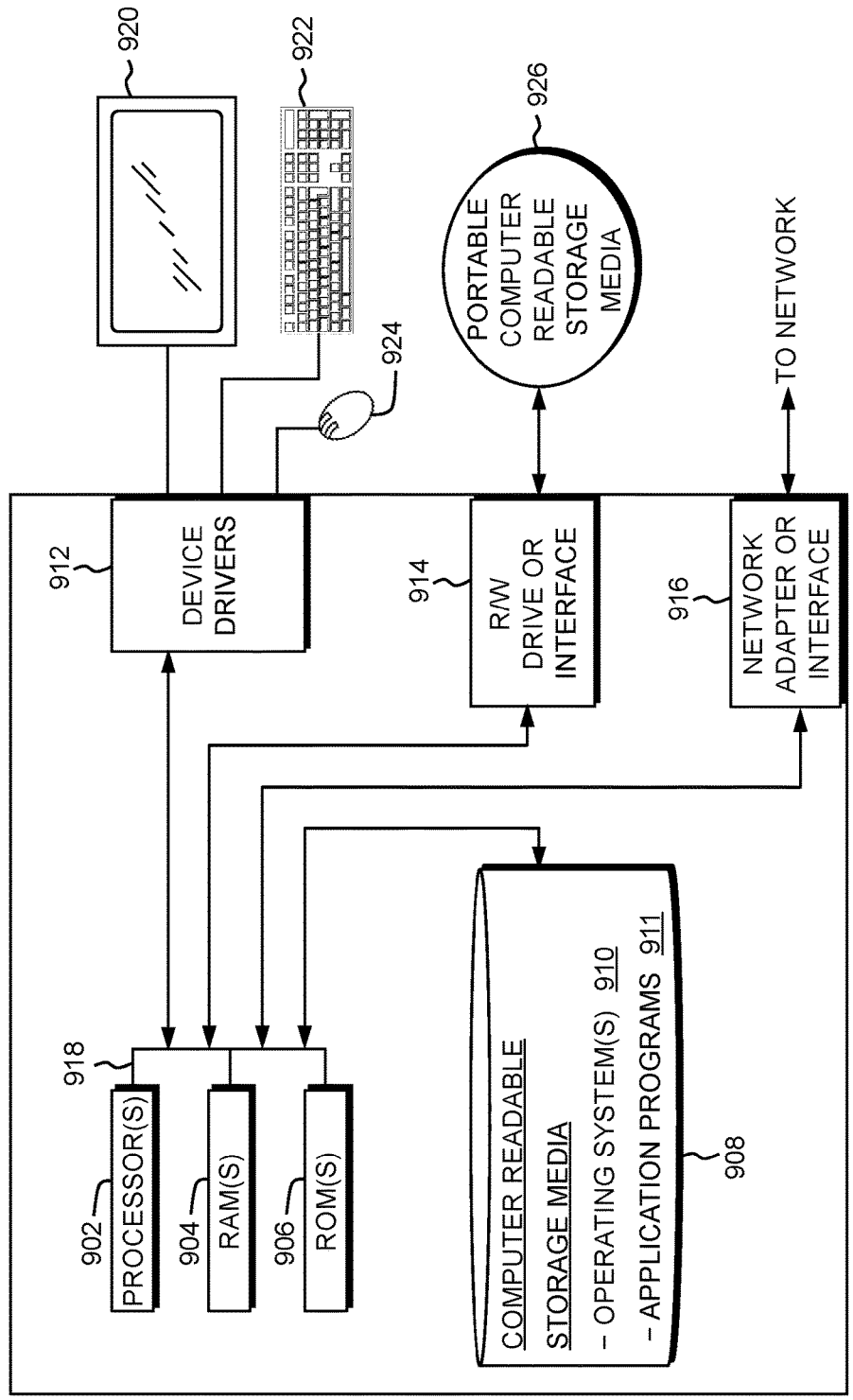
FIG. 8 depicts a block diagram of components of a host CPU, in accordance with an embodiment of the present invention.

FIG. 8 depicts a block diagram of components of host CPU 102 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Host CPU 102 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, an application that requests data be retrieved from tape, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 may also include a R/W drive or interface 914 to read from and write to one or more portable computer readable storage media 926. Application programs 911 on host CPU 102 may be stored on one or more of the portable computer readable storage media 926, read via the respective R/W drive or interface 914 and loaded into the respective computer readable storage media 908.

Host CPU 102 may also include a network adapter or interface 916, such as a TCP/IP adapter card or wireless communication adapter (such as a 4G wireless communication adapter using OFDMA technology). Application programs 911 on host CPU 102 may be downloaded to the host CPU from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host CPU 102 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906). Device drivers 912 may also interface to tape appliance 100.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. An apparatus comprising:
a magnetic tape head module read element array that includes one or more servo readers and a plurality of read elements, wherein the servo readers and the plurality of read elements are configured in the tape head module read element array in accordance with a magnetic tape technology standard;
each read element of the plurality of read elements further comprising a plurality of read sensors;
a microprocessor operated to receive information indicative of a generation of the magnetic tape technology standard;
the microprocessor further operated to identify, based on the generation, a combination of read sensors in each read element from a plurality of combinations associated with a corresponding plurality of generations;
the microprocessor further operated to buffer signal data associated with each read sensor in each identified combination that results from electrical signals generated by each read sensor from magnetic transitions recorded on a magnetic tape recording medium in accordance with the generation of the magnetic tape technology standard as the magnetic tape recording medium passes by the tape head module read element array;
the microprocessor further operated to perform error detection and error correction operations on the buffered signal data for each identified combination of read sensors to generate verified track data in accordance with the generation of tape.

2. The apparatus of claim 1, wherein the magnetic tape technology standard is Linear Tape-Open.

3. The apparatus of claim 1, wherein each generation of the magnetic tape technology standard has an associated track pitch that is different from other generations of the magnetic tape technology standard.

4. The apparatus of claim 1, wherein each read sensor has the same width.

5. The apparatus of claim 1, wherein the read sensors in each read element include sensors having different widths.

6. The apparatus of claim 1, wherein the plurality of read sensors in each read element are configured such that for each identified combination of read sensors, track data read from the magnetic tape recording medium is within an acceptable bit error rate.

7. The apparatus of claim 1, wherein the read sensors in each read element are configured such that there are no gaps between the read sensors in the cross-track direction for read sensors identified for each generation.

8. The apparatus of claim 1, wherein each read sensor has a width in accordance with a generation of the magnetic tape technology standard.

9. A tape appliance comprising:
a special purpose magnetic tape head module that includes a read element array that includes one or more servo readers and a plurality of read elements, wherein the servo readers and the plurality of read elements are configured in the tape head module read element array in accordance with a magnetic tape technology standard, and wherein each read element of the plurality of read elements further comprises a plurality of read sensors;
a servo control circuit that performs servo tracking of the magnetic tape head module, based on electrical signals received from the one or more servo readers;
a read/write dataflow circuit that controls data transfer operations from each of the read sensors to a data buffer, based on electrical signals generated by each read sensor from magnetic transitions recorded on a magnetic tape recording medium as the magnetic tape recording medium passes by the tape head module read element array;
a microprocessor controller that controls the operation of the servo control circuit and the read/write dataflow circuit, wherein the microprocessor controller operates to:
receive information from a tape cartridge memory indicative of a generation of the magnetic tape technology standard with which data was written to the magnetic tape recording medium of the tape cartridge;
identify, based on the generation, a combination of read sensors in each read element from a plurality of combinations corresponding to a plurality of generations;
cause the servo control circuit to perform servo tracking based on the generation of the tape cartridge, such that the identified combination of read sensors in each read element track a data tracks of the magnetic tape recording medium of the tape cartridge;
cause the read/write dataflow circuit to write to the data buffer data received from each of the identified read sensors in each read element;
perform error detection and error correction operations on the buffered signal data for each identified combination of read sensors to generate verified track data in accordance with the generation of tape.

10. The tape appliance of claim 9, wherein the magnetic tape technology standard is Linear Tape-Open.

11. The tape appliance of claim 9, wherein each generation of the magnetic tape technology standard has an associated track pitch that is different from other generations of the magnetic tape technology standard.

12. The tape appliance of claim 9, wherein each read sensor has the same width.

13. The tape appliance of claim 9, wherein the read sensors in each read element include sensors having different widths.

14. The tape appliance of claim 9, wherein the plurality of read sensors in each read element are configured such that for each identified combination of read sensors, track data read from the magnetic tape recording medium is within an acceptable bit error rate.

15. The tape appliance of claim 9, wherein the read sensors in each read element are configured such that there are no gaps between the read sensors in the cross-track direction for read sensors identified for each generation.

16. The tape appliance of claim 9, wherein each read sensor has a width in accordance with a generation of the magnetic tape technology standard.

17. The tape appliance of claim 9, wherein the tape appliance includes a production tape head module that is substantially in constant physical engagement with the magnetic tape recording medium, and the servo control circuit is further operated to cause the special purpose tape head module to periodically physically engage the magnetic tape recording medium.

* * * * *